United States Patent
Nishii et al.

(10) Patent No.: US 7,854,787 B2
(45) Date of Patent: Dec. 21, 2010

(54) METHOD OF REMOVING COATING FROM COATED MAGNESIUM ALLOY PRODUCT, METHOD OF MAKING RECYCLED MAGNESIUM ALLOY AND METHOD OF RECYCLING COATING

(75) Inventors: Kota Nishii, Kawasaki (JP); Koichi Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/492,991

(22) Filed: Jul. 26, 2006

(65) Prior Publication Data

US 2006/0254388 A1  Nov. 16, 2006

Related U.S. Application Data

(62) Division of application No. 10/298,043, filed on Nov. 18, 2002, now abandoned.

(30) Foreign Application Priority Data

Jun. 10, 2002 (JP) ............................. 2002-168957
Jun. 21, 2002 (JP) ............................. 2002-181823

(51) Int. Cl.
*C22B 26/00* (2006.01)
(52) U.S. Cl. ........................................ 75/600
(58) Field of Classification Search ................ 75/600
See application file for complete search history.

(56) References Cited

U.S. PATENT DOCUMENTS

| 3,538,007 A | 11/1970 | Cooper et al. |
| 4,537,705 A | 8/1985 | Mahoney et al. |
| 5,106,675 A | 4/1992 | Ara et al. |
| 5,908,488 A * | 6/1999 | Schroder et al. ............. 75/386 |
| 6,316,115 B1 | 11/2001 | Lai et al. |

FOREIGN PATENT DOCUMENTS

| JP | 5-84746 | 4/1993 |
| JP | 6-114842 | 4/1994 |
| JP | 2000-263443 | 9/2000 |
| JP | 2001-20018 | 1/2001 |

OTHER PUBLICATIONS

Metals Handbook, Ninth Edition, vol. 5, Surface Cleaning, Finishing and Coating, ASM, 1982.

* cited by examiner

*Primary Examiner*—Roy King
*Assistant Examiner*—Jie Yang
(74) *Attorney, Agent, or Firm*—Kratz, Quintos & Hanson, LLP

(57) ABSTRACT

A method is provided for removing a coating from a coated magnesium alloy product. The method includes a first treatment step of immersing the coated magnesium alloy product in a first alkaline solution, and a second treatment step of immersing the magnesium alloy product, which has undergone the first treatment step, in a second alkaline solution or in an acid solution. The second alkaline solution is different from the first alkaline solution.

8 Claims, 5 Drawing Sheets

METHOD OF REMOVING COATING FROM COATED MAGNESIUM ALLOY PRODUCT, METHOD OF MAKING RECYCLED MAGNESIUM ALLOY AND METHOD OF RECYCLING COATING

This application is Divisional Application of prior application Ser. No. 10/298,043 filed on Nov. 18, 2002 now abandoned.

BACKGROUND OF THE INVENTION

1. Field of the Invention

The present invention relates to a method of recycling a coated magnesium alloy product. More particularly, the present invention relates to a method of removing a coating from a coated magnesium alloy product such as a magnesium alloy casing of a notebook computer or a cellular phone, a method of making a recycled magnesium alloy, and a method of recycling a coating of a coated magnesium alloy product.

2. Description of the Related Art

The casings of electronic devices such as notebook computers, cellular phones, PDAs are required to be strong, to efficiently diffuse heat generated by the inside components and to be suitable for efficient recycling. To meet such requirements, instead of conventional resin casings, metal casings are increasingly used for such mobile electronic devices.

As materials for forming such metal casings for electronic devices, attention is focused on light alloys mainly composed of light metals such as magnesium (Mg) or aluminum (Al) for making light electronic devices. Particularly, Mg has the highest specific strength among simple metals which can be used as a structural material, has a high heat dissipation capability which is comparable to Al, and has a low specific gravity which is about 70% of that of Al. Therefore, Mg alloy mainly composed of Mg can be suitably used for making the casings of electronic devices.

For molding articles from Mg alloy, die casting or thixomolding may be utilized. When a casing of a notebook computer, for example, is formed from molten Mg alloy by die casting or thixomolding, about 30-50 volume % of the molten metal injected by a single time of injection finally becomes portions of the casing. The remaining about 50-70 volume % of the molten Mg alloy solidifies in a sprue or a runner of the mold and is later cut away. In this way, with the die casting or thixomolding, a large part of the material is wasted in each time of the molding. Therefore, to attain the cost reduction and good use of resources of the earth, there is a demand for a technique for recycling the portions of the Mg alloy product which have conventionally been wasted in the molding process and the Mg alloy obtained from collected products to reuse as a material for injection molding.

JP-A-2000-47257 discloses a method of making a recycled Mg alloy from the portions of the Mg alloy product cut away after the injection molding. With this method, the portions of the Mg alloy product cut away after the injection molding are remelted together with flux, and its composition is controlled in the molten state. Then, the material is cooled for solidification to provide a recycled Mg alloy having an intended composition.

Generally, commercially available Mg alloy parts or products have coated surfaces. Unfavorably, when such Mg alloy product formed with a coating is melted for recycling, a large amount of organic gas is generated due to the burning of acrylic resin or urethane resin contained in the paint. Further, the molten metal may be unacceptably contaminated due to titanium or the like contained in the paint. Therefore, for getting a recycled Mg alloy from wasted products, the coating on the surfaces of the Mg alloy product need be removed before melting the Mg alloy product.

Techniques for removing coatings from the surfaces of the Mg alloy product are disclosed, for example, in JP-A-2000-263443 and JP-A-2001-20018. Specifically, JP-A-2000-263443 discloses wet blasting, wherein the coating is physically removed by spraying water working as fluid with particles of inorganic substance such as alumina. With the wet blasting, however, the proper removal of the coating is difficult when the coated surface of the Mg alloy product is irregular including projections and recesses. Specifically, the recesses are unlikely to be hit by the inorganic particles so that the coating at the recesses may not be sufficiently removed. Conversely, the projections are likely to be excessively hit by the inorganic particles so that the Mg alloy may be removed together with the coating.

JP-A-2001-20018 discloses thermally treating the coated Mg alloy product at a temperature at which the paint vaporizes in non-oxidizing atmosphere. However, this method requires a chamber for performing the thermal treating under particular conditions. Moreover, since a large amount of organic gas is generated after the paint is decomposed, this method further requires an apparatus for properly treating such gas.

As an alternative known method, the coating may be removed from the surfaces of the Mg alloy product using alkaline solution. Specifically, with this method, the coating is removed by immersing the coated Mg alloy product in alkaline solution for swelling the coating due to the action of the alkaline solution followed by rinsing for example. Conventionally, in such a method, the immersing of the coated Mg alloy product is performed until the coating entirely swells. Specifically, since such a coating is generally made up of an undercoat layer and an overcoat layer, the coated Mg alloy product continues to be immersed in alkaline solution until the both layers swell, which may take a long time of about two hours. Further, when the coating swells, metal powder and the like contained in the coating dissolves or diffuses, contaminating the alkaline solution. Therefore, the alkaline solution used until the entirety of the coating swells tends to be degraded relatively early during its repetitive use for the immersion.

JP-A-5-84746 and JP-A-6-114842 also disclose a method for removing a coating. However, these methods are intended for removing coating from a molded resin product, not an Mg alloy product.

Moreover, conventionally, the coating removed from the Mg alloy product by the immersion and the following rinsing is treated as industrial waste. Such treatment of the coating is not desirable in view of the good use of natural resources and the environmental preservation.

SUMMARY OF THE INVENTION

It is, therefore, an object of the present invention to provide a method of removing a coating from a magnesium alloy product properly in a short period of time while prolonging the lifetime of the treatment liquid used for the removal.

Another object of the present invention is to provide a method of making a recycled magnesium alloy utilizing the coating removing method.

Still another object of the present invention is to provide a method of recycling a coating utilizing the coating removing method.

According to a first aspect of the present invention, there is provided a method of removing a coating from a coated magnesium alloy product. The method comprises a first treatment step of immersing the coated magnesium alloy product in a first alkaline solution, and a second treatment step of immersing the magnesium alloy product, which has undergone the first treatment step, in a second alkaline solution or in an acid solution. The second alkaline solution is different from the first alkaline solution With this method, the coating formed on the surfaces of the magnesium alloy product can be removed properly in a relatively short time. Generally, a coating on a magnesium alloy product includes an overcoat layer for providing a desired color, and an undercoat layer for providing good adhesion of the overcoat layer to the surfaces of the base material, i.e. the magnesium alloy. The overcoat layer contains a resin component for paint, a color pigment, a dye and the like by a relatively large amount, which become factors for deteriorating the treatment liquid used for the removal of the coating. The overcoat layer tends to swell relatively quickly when immersed in alkaline solution. On the other hand, the undercoat layer tends to swell relatively slowly when immersed in an alkaline solution. In the conventional coating removing method using an alkaline solution, the coated magnesium alloy product continues to be immersed in the same alkaline solution until the overcoat layer and then the undercoat layer swell. In such immersion, the overcoat layer first swells due to the action of the alkaline solution. At this time, a relatively large amount of components contained in the overcoat layer dissolve or diffuse in the alkaline solution, thereby degrading the alkaline solution to a considerable degree. The alkaline solution thus degraded takes a long time for swelling the undercoat layer which is inherently unlikely to swell. For this reason, the conventional method takes a relatively long time for removing the entire coating.

According to the present invention, however, the coating is immersed in different solutions at least twice. Specifically, the first immersion treatment using the first alkaline solution ends when the overcoat layer is swelled for example. Then, after the overcoat layer is removed, the second immersion treatment is performed using a second alkaline solution which is different from the first alkaline solution, or an acid solution. Herein, the second alkaline solution "which is different from the first alkaline solution" means an alkaline solution which has not been used in the first treatment. Therefore, the second alkaline solution may have the same composition as that of the first alkaline solution. Alternatively, the second alkaline solution may differ in composition from the first alkaline solution. When the second treatment is performed using the second alkaline solution, the second alkaline solution directly acts on the undercoat layer because the overcoat layer has already been removed. Further, since the second alkaline solution has not been used for swelling the overcoat layer, its ability as treatment liquid is not degraded. Therefore, the second alkaline solution can reliably swell the undercoat layer which is inherently unlikely to swell, thereby causing the layer to be removed from the base alloy. As a result, the total time required for swelling and removing the coating entirely is shorter than that in the conventional method. When the second treatment is performed using an acid solution, the acid solution directly acts on the undercoat layer because the overcoat layer has already been removed. The acid solution decomposes or dissolves the undercoat layer due to the chemical action. Alternatively, the acid solution swells the undercoat layer for removal from the base material. Also in this case, the total time required for swelling and removing the coating entirely is shorter than that in the conventional method.

The method according to the first aspect of the present invention can prolong the lifetime of the treatment liquid used for the removal of the coating. Specifically, in the prior art method, the coated magnesium alloy product is continuously immersed in a same alkaline solution until the overcoat layer and then the undercoat layer are swelled. Therefore, the components which deteriorate the solution dissolve or diffuse in the alkaline solution both from the overcoat layer and from the undercoat layer. Therefore, the alkaline solution is considerably degraded in terms of its ability as treatment liquid, so that it cannot be repetitively used many times. That is, the treatment liquid used in the conventional method has a relatively short lifetime.

On the other hand, with the coating removing method according to the present invention, the coating is immersed in at least two solutions. Therefore, all of the components coming from the coating do not dissolve in either of the first alkaline solution or the second alkaline or acid solution to degrade the one solution considerably. Therefore, the deterioration of each solution is suppressed. Thus, each solution used in the method of the present invention can have a relatively long lifetime.

In this way, according to the first aspect of the present invention, the coating formed on the magnesium alloy product can be removed properly in a short period of time while prolonging the lifetime of treatment liquid used for the coating removal.

According to a second aspect of the present invention, there is provided a method of making a recycled magnesium alloy. This method comprises a coating removing step which includes a first treatment of immersing a coated magnesium alloy product in a first alkaline solution and a second treatment of immersing the magnesium alloy product in a second alkaline solution (which is different from the first alkaline solution) or in an acid solution, a melting step of melting the magnesium alloy product to provide molten metal, a component analyzing step for determining the content of at least one component contained in the molten metal, and a component controlling step for controlling the content of the component in the molten metal.

This method of making a recycled magnesium alloy includes the coating removing process according to the first aspect of the present invention. With this method, therefore, the coating can be removed properly from the coated magnesium alloy product in a short period of time while prolonging the lifetime of treatment liquid used for the coating removal, which leads to the efficient making of a recycled magnesium alloy.

According to a third aspect of the present invention, there is provided a method of recycling a coating. This method comprises the steps of removing a coating from a coated magnesium alloy product by a first treatment of immersing the coated magnesium alloy product in a first alkaline solution and a second treatment of immersing the magnesium alloy product in a second alkaline solution (which is different from the first alkaline solution) or in an acid solution, recovering the coating removed from the magnesium alloy product in the first treatment and the second treatment, and pulverizing the recovered coating to provide a recycled coating material.

This coating recycling method includes the coating removing process according to the first aspect of the present invention. With this method, therefore, the coating can be removed properly from the coated magnesium alloy product in a short period of time while prolonging the lifetime of treatment liquid used for the removal. Therefore, the coating can be efficiently recovered from the treatment liquid, which leads to the efficient making of recycled coating material. The recycled coating material may be added to a resin composition for molding a resin product. Preferably, the resin composition may contain a thermoplastic resin such as ABS resin, polycarbonate resin, polypropylene resin, polystyrene resin, polyamide resin or polyphenylene sulfide resin, for example. Alternatively, the recycled coating material may be added to asphalt as extender.

Preferably, in the methods according to the first through the third aspects of the present invention, the first alkaline solution and/or the second alkaline solution may contain potassium hydroxide as the main alkaline component. Further, the acid solution used in the second treatment may contain an organic acid as the main acid component.

Preferably, the first treatment and/or the second treatment using the alkaline solution may be performed at 60-90° C., and more preferably, at 70-80° C. The treatment at a temperature below 60° C. is not preferable, because the coating does not sufficiently swell. Further, the treatment at a temperature higher than 90° C. is not preferable, because the alkaline solution excessively acts on the metal powder contained in the coating to generate a relatively large amount of metal hydroxide, which promotes the degradation of the alkaline solution.

Preferably, in the case where acid solution is used for the second treatment, the second treatment may be performed at 20-70° C., and more preferably, at 30-60° C. The treatment at a temperature below 20° C. is not preferable, because the coating does not sufficiently swell or melt. Further, the treatment at a temperature higher than 70° C. is not preferable, because the acid solution excessively acts on the coating to dissolve even the magnesium alloy beneath the coating.

Preferably, each of the methods according to the first through the third aspect of the present invention may further include the step of rinsing the magnesium alloy product with water after the first treatment and/or the second treatment. After the first and/or the second treatment, the adhesion of the coating to the magnesium alloy product is weakened due to the swelling or the like. Therefore, when the magnesium alloy product in such a state is rinsed with water at a predetermined water pressure, the coating is duly removed from the magnesium alloy product. Preferably, the method according to the third aspect of the present invention further includes the step of recovering the coating removed from the magnesium alloy product in the rinsing step.

Preferably, in the method according to the second aspect of the present invention, the melting step may include melting a first flux together with the magnesium alloy product. The first flux functions to separate impurities contained in the magnesium alloy product from the molten metal. With this method, impurities can be properly removed as sludge or precipitate in the molten metal.

Preferably, a second flux which generates a gas for preventing the molten metal from oxidizing may be put into the molten metal before the component controlling step. With this method, it is possible to prevent the molten metal from oxidizing from its surfaces before the component controlling step, or during when the molten metal is left for cleaning for example.

DETAILED DESCRIPTION OF THE PREFERRED EMBODIMENTS

Figure 1:
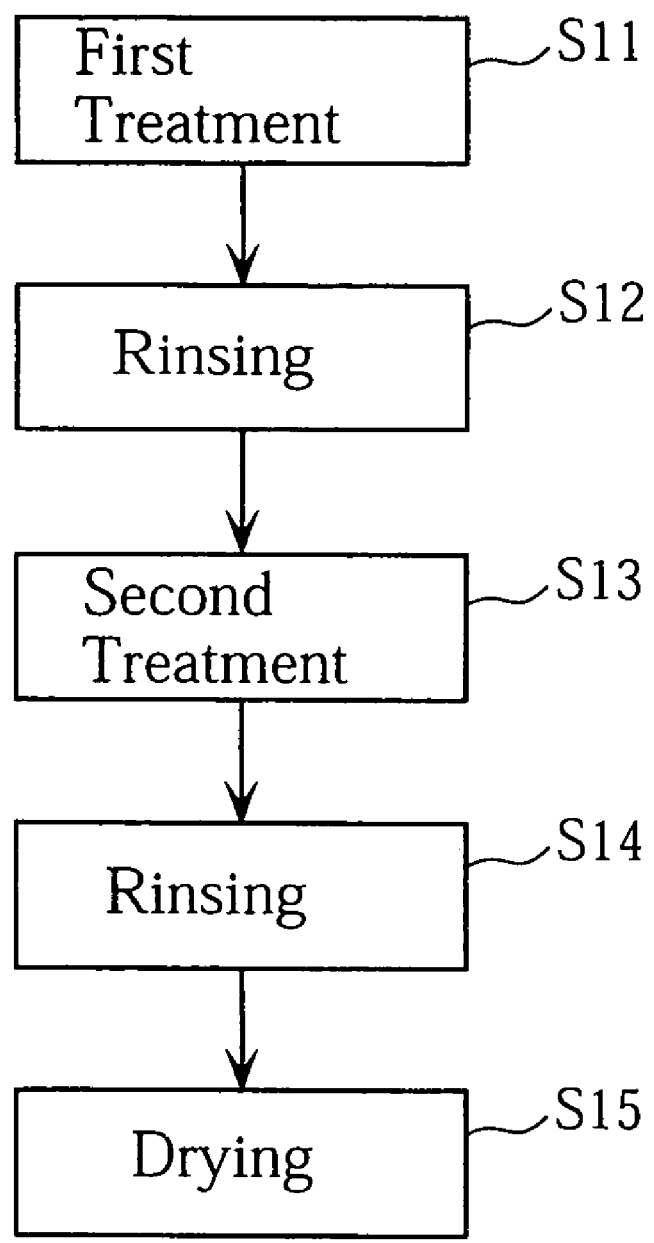
FIG. 1 is a flow chart of a coating removing method according to a first embodiment of the present invention.
Figure 2:
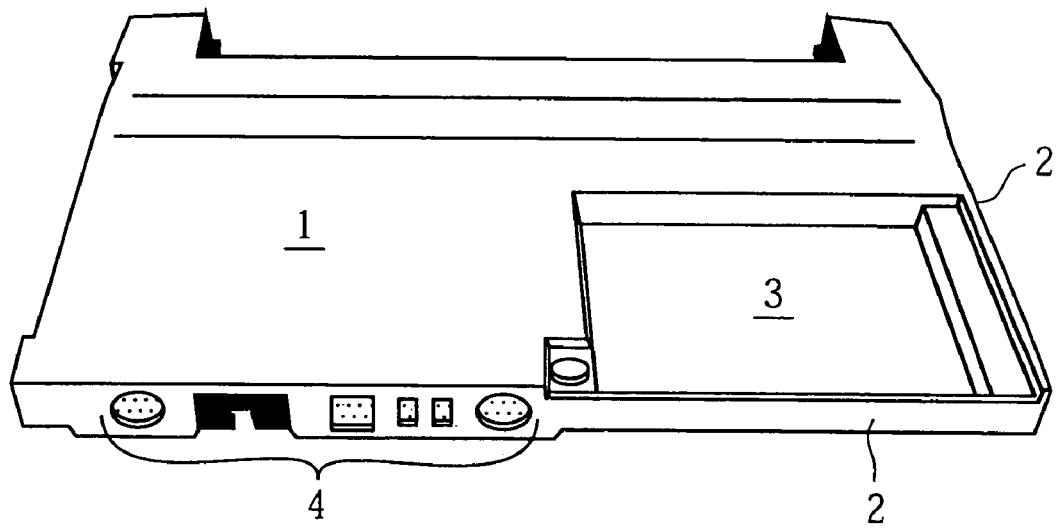
FIG. 2 illustrates an example of magnesium alloy casing of a notebook computer.

FIG. 1 is a flow chart illustrating a method of removing coating according to a first embodiment of the present invention. For example, this method may be utilized for removing the coating formed on the casing of a notebook computer formed of a magnesium alloy, as shown in FIG. 2. Specifically, the method is applicable to removing of the coating consisting of an undercoat layer mainly composed of an epoxy resin and an overcoat layer mainly composed of an acrylic resin, for example.

Firstly, a first treatment step S11 is performed, in which the Mg alloy product provided with a coating is immersed in a first alkaline solution. Specifically, in this step, the Mg alloy product is immersed in an alkaline solution of a volume 10-20 times that of the Mg alloy product for 20-60 minutes. During the immersion, the alkaline solution is kept at 60-90° C. Preferably, the first alkaline solution contains a hydroxide of alkali metal or alkali earth metal, particularly potassium hydroxide, as the alkaline component. Preferably, the concentration of potassium hydroxide in the first alkaline solution is 2-40 wt %. As a result of the first treatment step S11, the overcoat layer swells, weakening its adhesion to the undercoat layer. Thus, the overcoat layer is partially removed. The undercoat layer also swells at the portion where the overcoat layer has been removed, thereby weakening its adhesion to the Mg alloy product.

Subsequently, in a rinsing step S12, the Mg alloy product is pulled out from the first alkaline solution and is rinsed with water. Specifically, in this step, water is sprayed to the Mg alloy product at a pressure of 0.5-2 kgf/cm$^2$ using a shower. Alternatively, the Mg alloy product may be immersed in wash water stored in an appropriate bath. As a result of the rinsing step S12, the overcoat layer swelling on the Mg alloy product or pieces of the overcoat layer adhering to the Mg alloy product are physically removed from the Mg alloy product. Thus, by the steps S11 and S12, mainly the overcoat layer is removed from the Mg alloy product.

Subsequently, in a second treatment step S13, the Mg alloy product is immersed in a second alkaline solution. Specifically, in this step, the Mg alloy product is immersed in an alkaline solution of a volume 10-20 times that of the Mg alloy product. During the immersion, the second alkaline solution is kept at 60-90° C. The immersion may be continued for 30-70 minutes as long as the total immersion time of the immersion in the first treatment step S11 and the immersion in the second treatment step S13 does not exceed 90 minutes. The second alkaline solution may have the same composition as that of the first alkaline solution. Alternatively, an alkaline solution which differs from the first alkaline solution in composition may be used in view of the composition of the undercoat layer. As a result of the second treatment step S13, the undercoat layer swells, weakening its adhesion to the Mg alloy product. The undercoat layer is partially removed from the Mg alloy product.

In the second treatment step S13, acid solution may be used instead of the second alkaline solution. Specifically, in this case, the Mg alloy product is immersed in an acid solution of a volume 10-20 times that of the Mg alloy product for 5-30 minutes. During the immersion, the acid solution is kept at 20-70° C. Preferably, the acid solution contains an organic acid such as formic acid, acetic acid or benzoic acid as the acid component. In the case where the acid solution containing formic acid is used, it is preferable that the concentration of formic acid in the acid solution is 2-40 wt %. As a result of the second treatment step S13, the undercoat layer decomposes or dissolves for removal from the Mg alloy product.

Subsequently, in a rinsing step S14, the Mg alloy product is pulled out from the second alkaline solution or acid solution and is rinsed with water. Specifically, similarly to the rinsing step S12, water is sprayed to the Mg alloy product at a pressure of 0.5-2 kgf/cm$^2$ using a shower. Alternatively, the Mg alloy product may be immersed in wash water stored in an appropriate bath. As a result, the undercoat layer swelling on the Mg alloy product or pieces of the undercoat layer adhering to the Mg alloy product are physically removed from the Mg alloy product.

Subsequently, a drying step S15 is performed to dry the Mg alloy product. Specifically, for example, the Mg alloy product is left in a drying chamber kept at 50-80° C. for 30-60 minutes for drying.

Through the above steps, coating is duly removed from the magnesium alloy product. In the case of a notebook computer casing as shown in FIG. 2, the coating is removed not only from a flat portion 1 but also from side walls 2, a retreated portion 3 and an irregular portion 4. In this method, an alkaline solution or acid solution which has not been degraded in terms of treatment ability is used in the second treatment step 13. Therefore, the total immersion time of the first treatment step 11 and the second treatment step 13 required for the removal of the coating is shorter than the time of the single immersion in the conventional method. Further, it is possible to prevent all of the components which are contained in the coating and which contaminate the treatment liquid dissolve in either of the first alkaline solution or the second alkaline or acid solution. Therefore, each of the first and the second treatment liquids has a longer lifetime than the liquid used in the conventional method.

Figure 3:
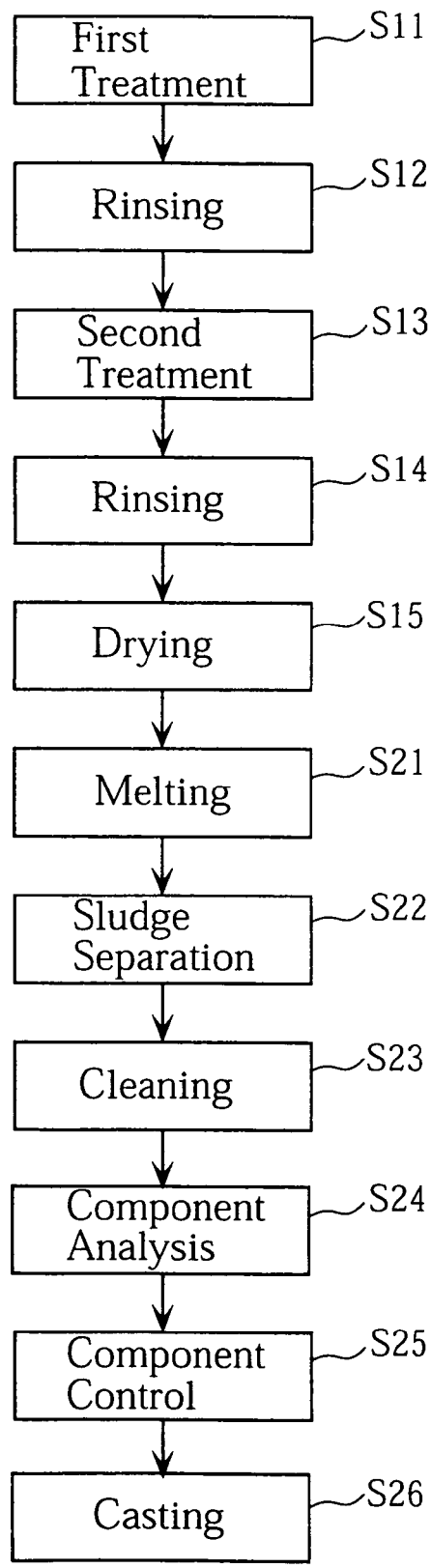
FIG. 3 is a flow chart of a method of making a recycled magnesium alloy according to a second embodiment of the present invention.

FIG. 3 is a flow chart illustrating a method of making a recycled magnesium alloy according to a second embodiment of the present invention. It is known that, through the recycling process of an Mg alloy product, the content of Fe in the alloy tends to increase, whereas the content of Mn in the alloy tends to decrease. Therefore, in the embodiment described below, the Fe content and the Mn content in the Mg alloy are controlled to provide a recycled Mg alloy for forging which is equivalent to JIS MD1D or AZ91d.

First, as shown in FIG. 3, the process steps from a first treatment step S11 through a drying step S15 are carried out similarly to the first embodiment described with reference to FIG. 1. As a result, an Mg alloy product from which a coating has been removed is obtained.

Subsequently, in a melting step S21, the Mg alloy product is melted together with a first flux in a melting furnace. Specifically, the coating-free Mg alloy as pellets or an ingot is put into a melting furnace heated to about 680° C. in advance, together with a first flux in powder form. The temperature of the furnace is then raised to about 720° C. for melting the Mg alloy and the flux. At this time, the molten Mg alloy in the melting furnace is stirred by rotating a mechanical impeller for homogenization. The first flux is added mainly to reduce oxides generated during the melting and to settle impurities such as oil in the molten metal as a sludge in the subsequent process step. For the first flux, use may be made of halide of alkali metal or alkali earth metal. Specifically, the first flux may be a powdery mixture containing 40-60 wt % $MgCl_2$, 15-35 wt % KCl, 1-10 wt % $CaF_2$ and 10-30 wt % $BaCl_2$. If the surface of the molten metal ignites, the first flux may further be added as required.

Subsequently, in a sludge separation step S22, impurities in the molten metal are separated as a sludge by continuing the agitation of the molten metal. In this step, when the separation of the sludge is confirmed, a second flux in powder form is added to the molten metal to promote the separation of the sludge. For the second flux, use may be made of a flux contains the same components as the first flux but differs therefrom with respect to the proportions of the respective components. Preferably, the proportion of $BaCl_2$, which has a relatively large specific gravity, in the second flux is lower than that in the first flux. Specifically, the second flux may be a powdery mixture containing 60-75 wt % $MgCl_2$, 20-35 wt % KCl, 1-5 wt % $CaF_2$ and 1-10 wt % $BaCl_2$. If the surface of the molten metal ignites, the second flux may further be added as required.

Then, in a cleaning step S23, the molten metal is cleaned. Specifically, the molten metal is kept still for 10-30 minutes after the stirring is stopped, thereby allowing the sludge to settle at the bottom of the melting furnace. At this time, a third flux is added to the molten metal to form an anti-oxidation gas layer covering the surface of the molten metal. Specifically, the third flux thus added decomposes due to the heat of the molten metal, generating a gas for preventing the oxidation of the molten metal. As the gas fills the melting furnace, the surface of the molten metal is covered with the anti-oxidation gas layer. For the third flux, use may be made of a powdery mixture containing 60-90 wt % sulfur (S) and 10-40 wt % $MgF_2$.

Subsequently, in a component analysis step S24, analysis is performed with respect to the components contained in the cleaned molten metal. Specifically, part of the molten metal is extracted from the melting furnace to cast a columnar sample which is 5 cm in diameter and 5 cm in length, for example. Then, the component analysis is performed with respect to the sample to determine the contents of Fe and Mn in the molten metal. The analysis may be carried out by the arc emission spectrochemical analysis for example.

Then, in a component controlling step S25, the content of Fe and Mn each is controlled to a desired range based on the analysis results obtained in the former step. For example, to provide an Mg alloy for forging equivalent to AZ91D, the content of Fe need be controlled to no more than 40 ppm (0.004 wt %), whereas the content of Mn need be controlled to the range of 0.17-0.4 wt %.

As described before, it is known that the content of Fe in an Mg alloy increases through the recycling process. Therefore, to properly control the Fe content, an appropriate amount of Fe-settling agent is added to the molten metal in accordance with the amount of excess Fe. For the Fe-settling agent, use may be made of Al—Mn intermetallic compound. On the other hand, it is known that the content of Mn in an Mg alloy decreases through the recycling process. Therefore, to properly control the Mn content, an appropriate amount of Mn-supplying medium is added to the molten metal in accordance with the shortage amount of Mn. For the Mn-supplying medium, use may be made of pure Mn or a compound containing Mn. For example, Al—Mn intermetallic compound may be used also as the Mn-supplying medium. In the case where the content of Fe and Mn lies in a proper range from the beginning, neither the Fe-settling agent nor the Mn-supplying medium is not added.

The addition of the Fe-setting agent and/or the Mn-supplying medium to the molten metal is followed by stirring and cleaning of the molten metal in the component controlling step S25. Thereafter, the component analysis step S24 is carried out again. In this way, the component controlling step S25 and the component analysis step S24 are repeated until the contents of Fe and Mn lies in a proper range.

Subsequently, in a casting step S26, the molten metal having a desired composition is cast into an ingot of a predetermined size. In this way, a recycled Mg alloy is obtained in the form of an ingot.

With the method of making a recycled Mg alloy according to the present invention, a coating can be efficiently removed from the coated Mg alloy product by the first treatment step S11 through the rinsing step S14, so that a recycled Mg alloy can be efficiently obtained. Further, since the Mg alloy product is melted after removal of the coating, the generation of organic gases due to the burning of the resin material contained in the coating can be avoided. For the same reason, the molten metal is prevented from being excessively contaminated by metals (e.g. Ti contained in the paint) which are undesirable for a Mg alloy. Moreover, although the contents of Fe and Mn in the Mg alloy may vary depending on the number of recycle times and other factors, the method of the present invention makes it possible to control these contents individually and flexibly. Thus, with the method according to the present invention, it is possible to efficiently and properly make a recycled Mg alloy having an intended composition, i.e., the composition equivalent to that of a virgin Mg alloy.

Figure 4:
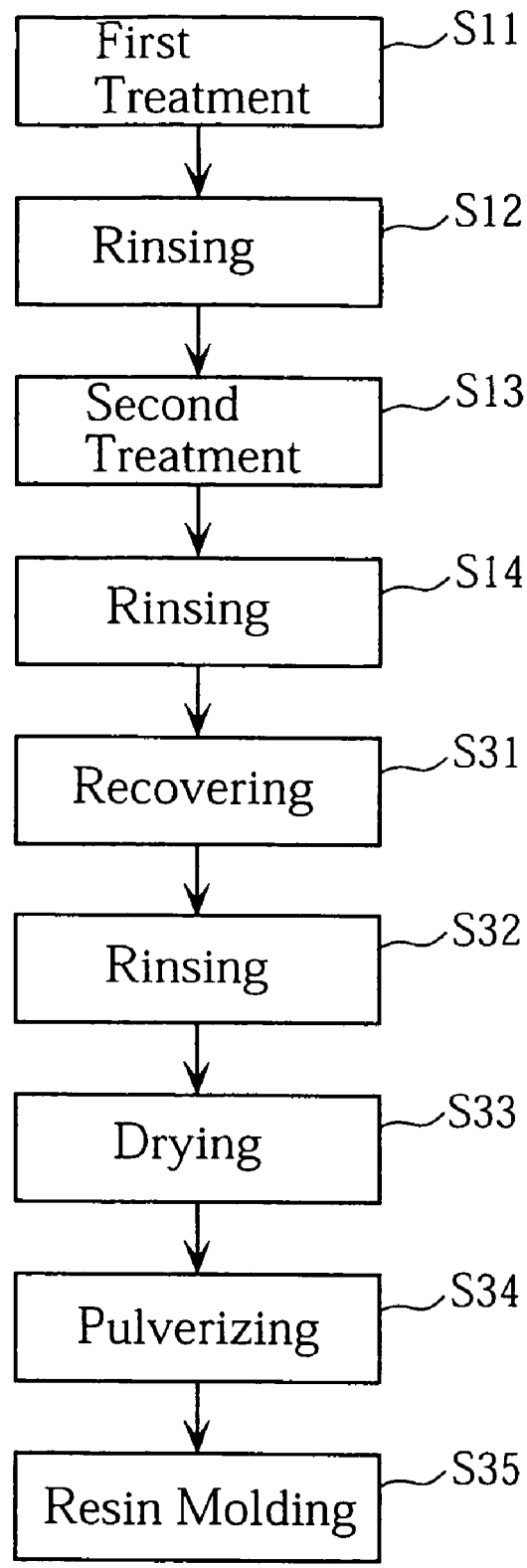
FIG. 4 is a flow chart of a coating recycling method according to a third embodiment of the present invention.

FIG. 4 is a flow chart illustrating a method of recycling coating according to a third embodiment of the present invention. In this method, as shown in the figure, the process steps from a first treatment step S11 through a rinsing step S14 are carried out similarly to the first embodiment described with reference to FIG. 1. As a result, coating is removed from a coated Mg alloy product.

Subsequently, in a recovering step S31, the pieces of the coating removed from the magnesium alloy product in the first treatment step S11 through the rinsing step S14 are recovered. Specifically, filtration is performed with respect to the first alkaline solution used in the first treatment step S11, the second alkaline solution or acid solution used in the second treatment step S13 and water used in the rinsing step S12 and S14, thereby separating the pieces of the coating removed from the Mg alloy product from these treatment liquids.

Then, in a rinsing step S32, the recovered pieces of the coating are rinsed with water to satisfactorily remove the treatment liquid adhering thereto. Subsequently, a drying step S33 is performed to dry the pieces of the coating. Specifically, for example, the coating pieces are left in a drying chamber kept at 80° C. for 2 hours for drying. Then, a pulverizing step S34 is performed to pulverize the dried coating pieces to a desired particle size. Specifically, for example, the coating pieces are put into a mortar and pulverized to a particle size of no more than 1 mm. Thus, pellets of a recycled coating material are obtained.

Subsequently, in a resin molding step S35, a resin product is molded utilizing the pellets of the recycled coating as an extender. Specifically, a thermoplastic resin material and the recycled coating material are mixed for melting at a predetermined mixing ratio using a twin-screw extruder, for example. Specifically, the proportion of the recycled coating pellet added is 10-60 wt %. For the thermoplastic resin, use may be made of ABS resin, polycarbonate resin, polypropylene resin, polystyrene resin, polyamide resin and polyphenylene sulfide resin. Then, the resin composition thus obtained is molded into an article of a desired configuration using an injection molding machine. As an alternative usage, the recycled coating pellets may be added to asphalt as extender.

The present invention will now be described through examples and comparative examples.

Example 1

Preparation of Recycled Mg Alloy Product

The casing of a notebook computer as shown in FIG. 2 was immersed in 2 L of a first alkaline solution. The casing was made of an Mg alloy and had coated surfaces, and the coating on the surfaces of the casing was made up of an undercoat layer mainly composed of epoxy resin and an overcoat layer mainly composed of acrylic resin. The first alkaline solution used contained 3.5 wt % potassium hydroxide, 2.5 wt % sodium hydroxide, 20 wt % anionic surface active agent and 40 wt % diethylene glycol monoethyl ether. During the immersion, the first alkaline solution was kept at 70° C. The immersion was performed for 10 minutes. As a result, mainly the overcoat layer of the coating swelled. Then, the Mg alloy casing was pulled out from the first alkaline solution and rinsed with running water at 1 kgf/cm². As a result, mainly the overcoat layer was removed.

Subsequently, the Mg alloy casing was immersed in a second alkaline solution having the same composition as that of the first alkaline solution. During the immersion, the second alkaline solution was kept at 70° C. The immersion was performed for 40 minutes. As a result, the undercoat layer of the coating swelled. Then, the Mg alloy casing was pulled out from the second alkaline solution and rinsed with running water at 1 kgf/cm². As a result, the undercoat layer was removed. The Mg alloy casing was then left in a drying chamber for drying. Thus, the coating formed on the flat portion 1, the side walls 2, the retreated portion 3 and the irregular portion 4 of the casing shown in FIG. 2 was properly removed by the immersion which took 50 minutes in total.

Subsequently, the Mg alloy casing which was 30 kg after the removal of coating and 1 kg of first flux were put into a melting furnace (60 L) heated to about 680° C. in advance. Thereafter, the temperature in the melting furnace was raised to 720° C. for melting the materials therein. The first flux used was powder mixture containing 50 wt % $MgCl_2$, 25 wt % KCl, 5 wt % $CaF_2$ and 20 wt % $BaCl_2$. During the melting, the Mg alloy was stirred with a mechanical impeller rotating at 100 rpm for providing homogeneous molten metal.

While the stirring is continued, 0.2 kg of second flux was added to the molten metal when sludge started to separate from the molten metal. The second flux used was powder mixture containing 67.5 wt % $MgCl_2$, 27.5 wt % KCl, 1 wt % $CaF_2$ and 4.5 wt % $BaCl_2$. The second flux was further added by 0.1 kg each in accordance with the inflammation state at the surface of the molten metal. The addition of the second flux promoted the separation of sludge from the molten metal.

Subsequently, the stirring was stopped and the molten metal was kept still for 20 minutes, allowing sludge to settle in the molten metal for cleaning the molten metal. At this time, immediately after the stirring was stopped, 0.2 kg of third flux was added to the molten metal. The third flux used was powder mixture containing 80 wt % sulfur (S) and 20 wt % $MgF_2$. The addition of the third flux caused the generation of $SF_6$ filling the melting furnace, so that anti-oxidation gas layer of $SF_6$ was formed to cover the surfaces of the molten metal. Thus, sludge was settled to a sufficient degree while preventing the oxidation of the molten metal.

After the molten metal was thus cleaned, 0.2 kg of molten metal was extracted, which was cast into a columnar sample which was 5 cm in diameter and 5 cm in length. Then, this sample was subjected to component analysis using an arc emission spectrophotometer (Tradename:PDA-5500II, Supplier:Shimadzu Corporation). As a result, the Fe content was found to be 0.0058 wt % whereas the Mn content was found to be 0.120 wt %.

Subsequently, to decrease the Fe content while increasing the Mn content, Al—Mn intermetallic compound serving as both Fe-settling agent and Mn-supplying medium was put into the melting furnace. Specifically, to provide an Mg alloy for forging equivalent to AZ91D (Fe: no more than 0.004 wt %, Mn: 0.17-0.4 wt %), 4 kg of Al—Mn intermetallic compound was added. After the component control was performed in this way, the molten metal was stirred and then kept still for 10 minutes for cleaning.

Subsequently, 0.2 kg of molten metal was extracted, which was cast into a columnar sample which was 5 cm in diameter and 5 cm in length. Then, this sample was subjected to component analysis using an arc emission spectrophotometer (Tradename: PDA-5500II, Supplier: Shimadzu Corporation). As a result, it was found that the Fe content decreased to 0.0015 wt % whereas the Mn content increased to 0.210 wt %. Thus, the molten metal having the desired composition was obtained. Then, the molten metal was cast into five ingots (5 kg). In this way, a recycled Mg alloy was obtained from a coated Mg alloy casing of a notebook computer.

[Measurement of Bending Strength]

From the recycled Mg alloy obtained in the above-described manner, five samples corresponding to JIS Z 2204 1 (10 mm×50 mm×3.2 mm) were prepared by die casting for measuring the bending strength. Specifically, the measurement was performed with respect to each of the samples by three-point bending test based on JIS K 7055 using an universal testing machine (Tradename: INSTORON5581, Supplier: Instron Japan Co Ltd). In the measurement, with the sample supported at two support points spaced from each other by 40 mm (span: 40 mm), load was applied to the sample at the generally middle of the span while moving at a speed of 2 mm/min. The three-point bending test was performed under the same condition also with respect to five samples corresponding to JIS Z 2204 1 obtained from a virgin material (AZ91D). As a result, the recycled Mg alloy sample was found to have an average bending strength of about 400 MPa, which was generally equal to that of the virgin material. The difference between the maximum value and the minimum value was about 13%.

[Corrosion Test]

From the recycled Mg alloy obtained in the above-described manner, five samples corresponding to JIS Z 2204 1 (10 mm×50 mm×3.2 mm) were prepared by die casting. With respect to these samples, corrosion resistance was measured by the salt spray test based on JIS Z 2371. The test was performed under the same condition also with respect to five samples corresponding to JIS Z 2204 1 obtained from a virgin material. As a result, the amount of corrosion of the recycled Mg alloy was found to be generally equal to that of the virgin material.

[Formability Test]

From the recycled Mg alloy obtained in the above-described manner, 50 casings (320 mm×240 mm×1.2 mm) of notebook computers as shown in FIG. 2 were formed by die casting. Similarly, 50 casings of notebook computers were formed from a virgin material. As a result, the recycled Mg alloy product was found to have a formability which was almost equal to that of the virgin material. For example, the non-defective product rate was about 80% which was generally equal to that of the virgin material. The non-defective product rate herein means the rate of products which are free from cracks or shrink marks in the state of molded-piece due to short shot of the molten metal and the like and which therefore have good appearance to meet the requirement as a product.

Example 2

Similarly to Example 1, the casing of a notebook computer as shown in FIG. 2 as a coated Mg alloy product was immersed in the first alkaline solution and then rinsed to remove the overcoat layer of the coating. Subsequently, the Mg alloy casing was immersed in 2 L of acid solution. The acid solution used contained 5 wt % formic acid as organic acid, 15 wt % benzyl alcohol and 40 wt % ethylene glycol monobutyl ether. During the immersion, the acid solution was kept at 40° C. The immersion was performed for 5 minutes. Then, the Mg alloy casing was pulled out from the acid solution and rinsed with running water at 1 kgf/cm$^2$. As a result, the undercoat layer of the coating was removed. The Mg alloy casing was then left in a drying chamber for drying. Thus, the coating formed on the flat portion 1, the side walls 2, the retreated portion 3 and the irregular portion 4 of the casing shown in FIG. 2 was properly removed by the immersion which took 15 minutes in total.

Similarly to Example 1, the Mg alloy casing from which the coating had been removed was then subjected to the process steps from the melting in the melting furnace through the casting of ingots of 5 kg. The recycled Mg alloy thus obtained was checked with respect to the bending strength, corrosion resistance and formability in the same manner as in Example 1. As a result, the recycled Mg alloy of this example was found to have characteristics or physical properties similar to that of Example 1.

Comparative Example 1

Similarly to Example 1, the casing of a notebook computer as shown in FIG. 2 as a coated Mg alloy product was immersed in 2 L of first alkaline solution. The first alkaline solution used had the same composition as that of Example 1. During the immersion, the first alkaline solution was kept at 70° C. The Mg alloy casing was then rinsed with running water at 1 kgf/cm$^2$. For the sufficient removal of the coating, the immersion in the first alkaline solution needed be continued for no less than 90 minutes. If the immersion is stopped after the lapse of about 50 minutes and the Mg alloy product still carrying the coating is used for making a recycled Mg alloy, organic toxic gas and a large amount of precipitates are generated during the melting step and the resulting alloy has a composition which differs largely from the desired one. Therefore, the productivity of a recycled Mg alloy is considerably deteriorated.

Example 3

Two hundred casings of notebook computers as shown in FIG. 2 as coated magnesium alloy products were held on a jig and immersed in 800 L of first alkaline solution stored in a treatment bath (1 m$^3$) made of stainless steel. The coating formed on the surfaces of the computer casing was made up of an undercoat layer mainly composed of epoxy resin and an overcoat layer mainly composed of urethane resin. The first alkaline solution used contained 3.5 wt % potassium hydroxide, 2.5 wt % sodium hydroxide, 20 wt % anionic surface active agent and 40 wt % diethylene glycol monoethyl ether. During the immersion, the first alkaline solution was kept at 70° C. The immersion was performed for 10 minutes. As a result of the immersion, mainly the overcoat layer of the coating swelled and partially removed. The casings were then pulled out from the first alkaline solution and immersed in 800 L of first rinsing water stored in a treatment bath (1 m$^3$). As a result, about 90% of the coating was removed from the casings.

Subsequently, the 200 casings were immersed in 800 L of acid solution stored in a treatment bath (1 m$^3$). The acid solution used contained 5 wt % formic acid as organic acid, 15 wt % benzyl alcohol and 40 wt % ethylene glycol monobutyl ether. During the immersion, the acid solution was kept at 40° C. The immersion was performed for 5 minutes. As a result of the immersion, mainly the undercoat layer of the coating swelled and was partially removed. The casings were then pulled out from the acid solution and immersed in 800 L of second rinsing water stored in a treatment bath (1 m$^3$). As a result, the coating was entirely removed. Then, the Mg alloy casings were left in a drying chamber for drying. In this way, the coating formed on the flat portion 1, the side walls 2, the retreated portion 3 and the irregular portion 4 of each casing as shown in FIG. 2 was properly removed by the immersion which took 15 minutes in total. Using the Mg alloy casing from which the coating had been removed, a recycled Mg alloy was prepared in the same manner as in Example 1.

The pieces of coating mainly composed of epoxy resin or urethane resin were recovered from the first alkaline solution, the first rinsing water, the acid solution and the second rinsing water used for removal of the coating. Specifically, filtration was performed with respect to each of these treatment liquids in which pieces of coating precipitated or floated, thereby separating the coating pieces from the liquids. Then, the recovered pieces of coating were rinsed with water to satisfactorily remove the treatment liquid adhering thereto. Subsequently, the coating pieces were left in a drying chamber kept at 80° C. for 2 hours for drying. Then, the dried pieces of coating were put into a mortar and pulverized to a particle size of no more than 1 mm. In this way, about 4 kg of recycled coating material in a pellet state was obtained from 200 Mg alloy casings.

Figure 5:
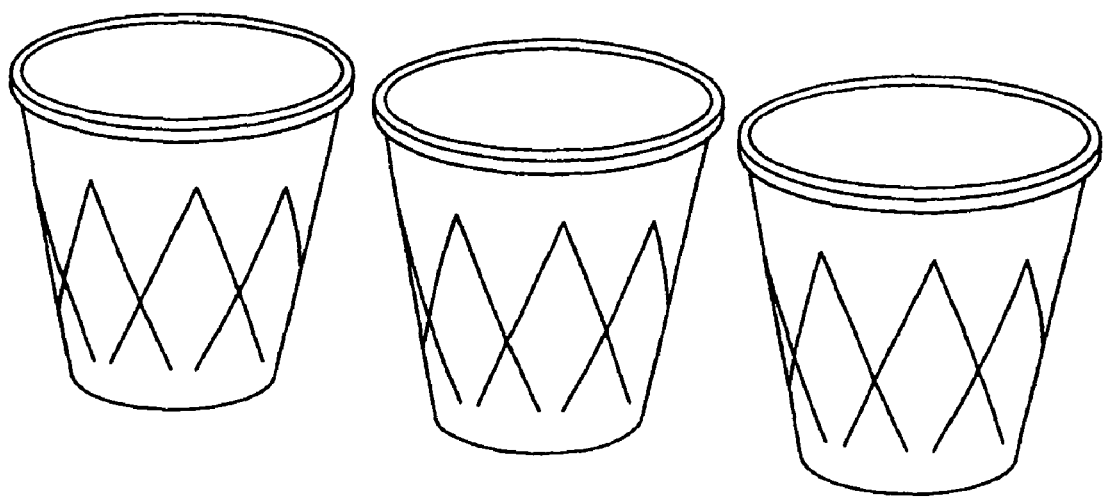
FIG. 5 illustrates flowerpots provided by the coating recycling method according to the present invention.

Subsequently, the recycled coating pellet and polypropylene resin were mixed at the mixing ratio of 1:1 for melting using a twin-screw extruder (Tradename: KZW 15-30MG, Supplier: Technovel Corporation). The mixing was performed at 220° C. with the mixing unit rotating at 100 rpm. From the resin compound thus obtained, flowerpots as shown in FIG. 5 (height: 300 mm, opening diameter: 300 mm, wall thickness: 2.5 mm) were molded using an injection molding machine (Tradename: AUTOSHOT, Supplier: Fanuc Ltd.). The flower pots had good appearance and sufficient strength for practical use. In this way, the coating of the Mg alloy product was properly recycled.

The invention claimed is:

1. A method of making a recycled magnesium alloy comprising:
    a coating removing step which includes a first treatment of immersing a coated magnesium alloy product in a first alkaline solution, and a second treatment of immersing the magnesium alloy product in a second alkaline solution or in an acid solution, the second alkaline solution being different from the first alkaline solution;
    a melting step of melting the magnesium alloy product to provide molten metal;
    a component analyzing step for determining a content of at least one component contained in the molten metal; and
    a component controlling step for controlling the content of the component in the molten metal;
    wherein the coating includes an undercoat layer made of a first resin and an overcoat layer made of a second resin different from the first resin, the first treatment step being performed for removing the overcoat layer at least partially by causing the overcoat layer to swell while also causing the undercoat layer to swell at portions where the overcoat layer is removed, and the second treatment step being performed for removing the undercoat layer at least partially;
    wherein a second flux is put into molten metal before the component controlling step, the second flux functioning to generate a gas for preventing the molten metal from oxidizing.

2. The method according to claim 1, wherein the melting step includes melting a first flux together with the magnesium alloy product, the first flux functioning to separate impurities contained in the magnesium alloy product from the molten metal.

3. The method according to claim 1, further comprising the step of rinsing the magnesium alloy product with water after the first treatment and/or the second treatment.

4. The method according to claim 1, wherein the first alkaline solution and/or the second alkaline solution contains potassium hydroxide as a main alkaline component.

5. The method according to claim 1, wherein the acid solution contains an organic acid as a main acid component.

6. The method according to claim 1, wherein the first treatment and/or the second treatment using the second alkaline solution is performed at 60-90° C.

7. The method according to claim 1, wherein the first treatment is performed at 60-90° C., whereas the second treatment using the acid solution is performed at 20-70° C.

8. The method according to claim 1, wherein the undercoat layer is made of an epoxy resin, and the overcoat layer is made of an acrylic resin.

* * * * *